United States Patent Office.

MARY ANN HILT, OF SYRACUSE, NEW YORK

Letters Patent No. 69,995, dated October 22, 1867; antedated October 12, 1867.

IMPROVED MEDICAL COMPOUND.

*The Schedule referred to in these Letters Patent and making part of the same.*

TO ALL WHOM IT MAY CONCERN:

Be it known that I, MARY ANN HILT, of Syracuse, New York, have invented or discovered a new and improved composition of matter, which for the purposes of the trade is called "Mary A. Hilt's Immediate Catarrh Relief;" and I do hereby declare that the following is a full, clear, and exact description of the same, the process by which it is made, and the ingredients which compose it.

I take a pint and a half of cold rain-water and put into it one-eighth of an ounce of hops. Boil it until the strength of the hops is thoroughly extracted. It is better to keep the vessel covered while boiling. I strain the liquid while it is hot, and then put into it one-quarter of an ounce of gold-thread, (*Coptis trifolia.*) The liquid is then boiled again until the strength is extracted from the gold-thread. While hot it is again strained, and in it two drachms of alum dissolved. The last boiling should be long enough so that when the alum is added there will be about thirteen ounces of the liquid.

What I claim as my invention or discovery, and desire to secure by Letters Patent, is—

The above-described composition, as made of the ingredients and compounded in the manner set forth.

MARY A. HILT.

Witnesses:
N. B. SMITH,
G. A. RICH.